UNITED STATES PATENT OFFICE 2,096,298

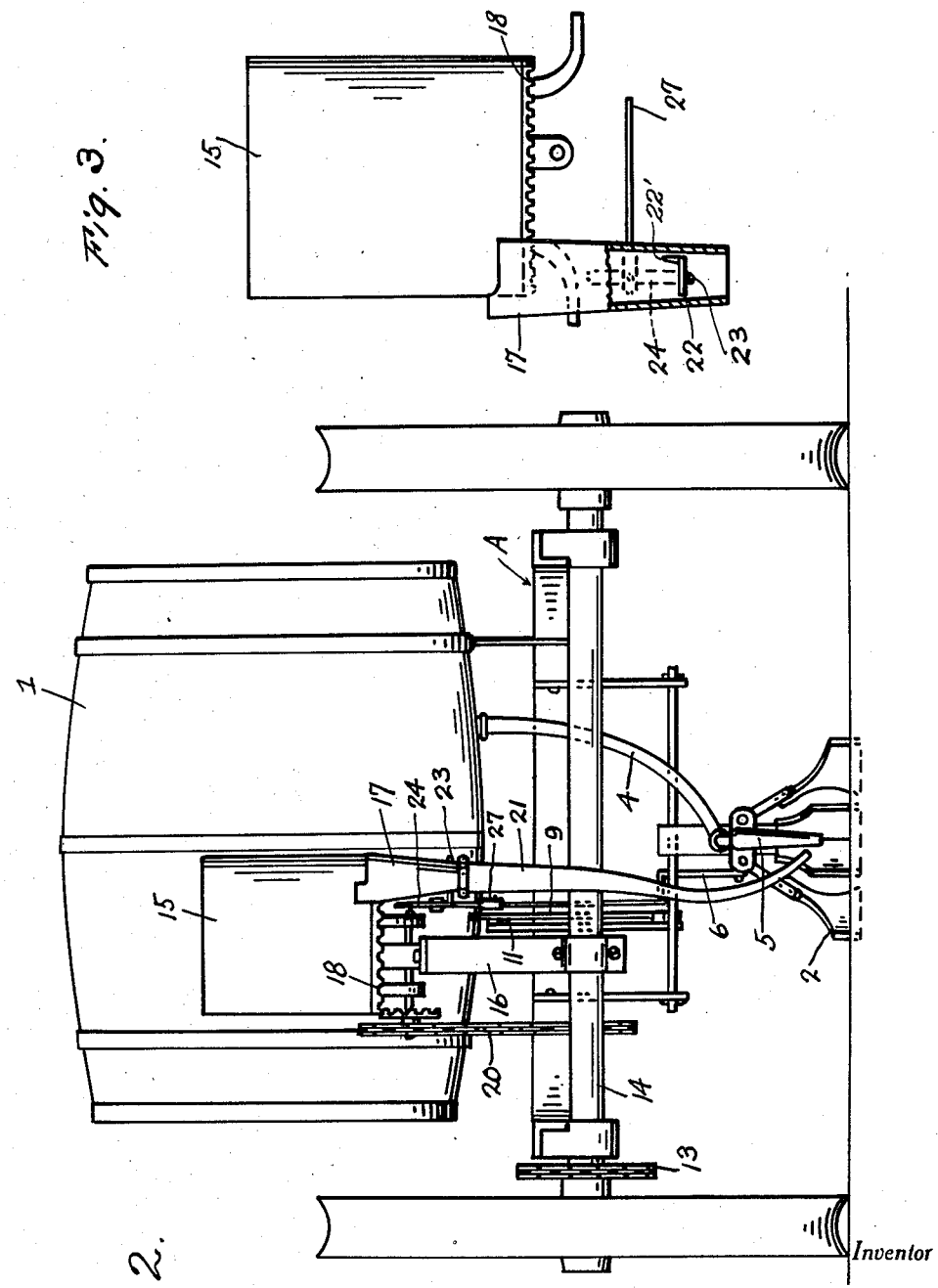

FERTILIZER ATTACHMENT FOR PLANTERS

Robert Lee Greenwell, Elliston, Ky.

Application November 19, 1935, Serial No. 50,601

2 Claims. (Cl. 111—7)

This invention relates to a fertilizer attachment for planters, the general object of the invention being to provide means for depositing fertilizer into a furrow at spaced points in said furrow and at such places in the furrow where seed is deposited by the planter or where water is deposited by planters used with the placing of plants in a row.

This invention also consists in certain other features of construction and in the combination and arrangement of several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 2 is a rear view of Figure 1.

Figure 3 is an elevation with parts broken away from the fertilizer attachment.

Figure 1:
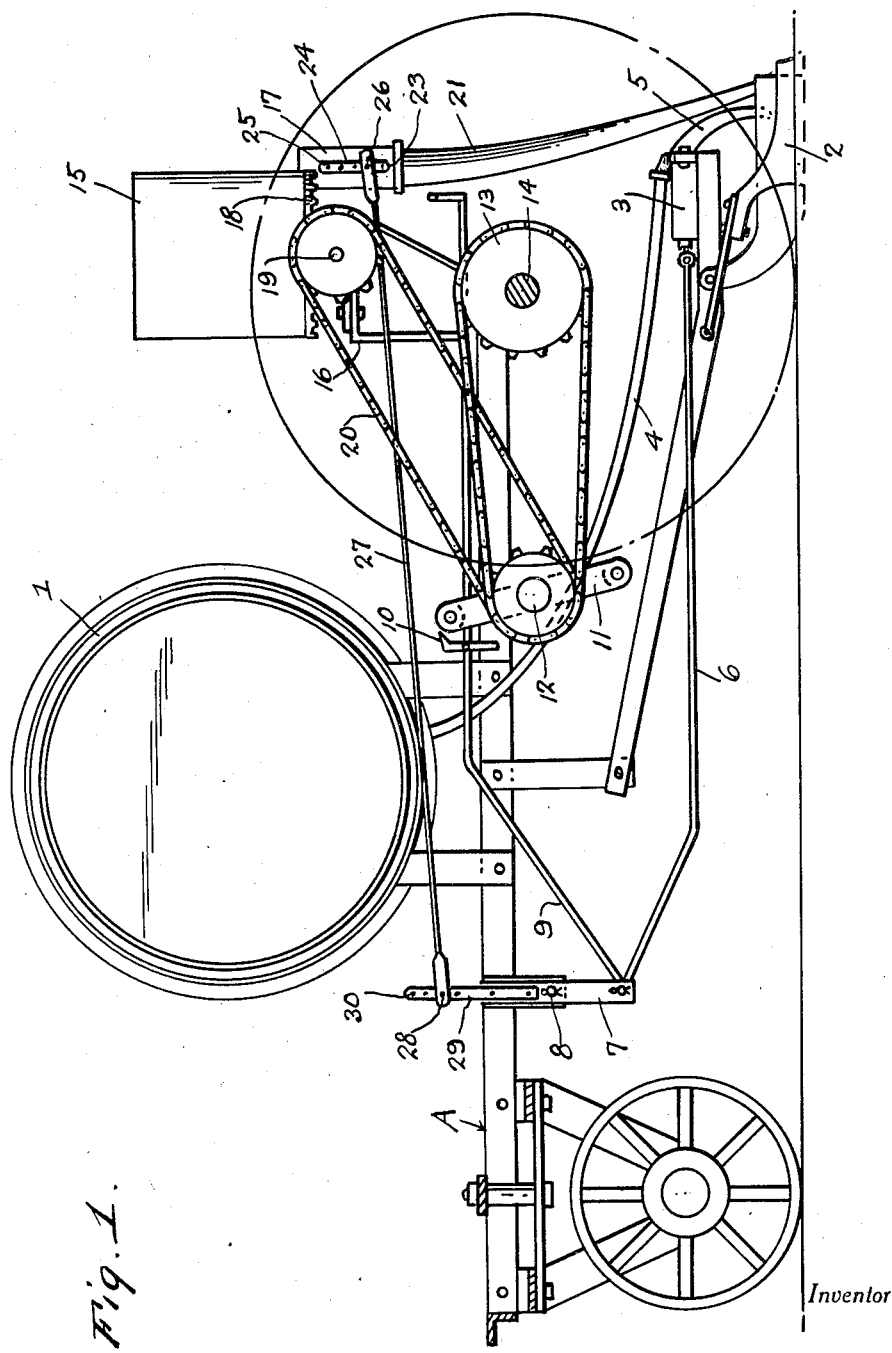
Figure 1 is a vertical longitudinal sectional view showing the invention applied to a planter which deposits water at spaced points in the furrow.

In these drawings the letter A indicates the wheel supported frame of a planter which includes the reservoir 1, the furrow opening means 2, the valve 3 for controlling the flow of water from the hose 4, leading from the tank or reservoir to the nozzle 5 and the actuating means for the valve. Said means includes a rod 6 connected with the valve and also connected to an arm 7 on a rock shaft 8, the rod 9 also connected with the rock shaft and having an adjustable projection 10 thereon for engagement by the rollers on the outer ends of the arms 11 carried by the shaft 12. Said shaft 12 is rotated through means of the sprockets and chain shown generally at 13 from the rear axle 14 of the implement.

As will be understood every time a roller or an arm 11 strikes the projection 10 the rod 9 is caused to rock the shaft 8 which, in turn, moves the rod 6 so that the valve 3 is opened and a certain amount of water will flow from the tank or reservoir 1 through the nozzle 5 and be deposited in the furrow made by the plow means 2. As soon as the roller leaves the projection 10 the parts return to the normal position so that the valve 3 will close and then the valve will be opened again when the other arm 11 has its roller engage the projection 10. Thus water is deposited at intervals in the furrow so that plants can be placed in the moist parts of the furrow in the usual manner.

In carrying out my invention I provide a container 15 for the fertilizer and I mount the container on the rear part of the instrument through means of the upright bracket 16. A small receiver 17 depends from the lower part of the container and the usual perforated plate 18 controls an opening in the bottom of the container 15 which is in communication with the receiver so that by the rotation of this plate 18 a certain amount of fertilizer passes from the container into the receiver. This plate 18 is operated in any suitable manner from a shaft 19 which is driven from the shaft 12 through means of the sprockets and chain shown generally at 20. A flexible tube 21 leads from the bottom of the receiver 17 to a point immediately in rear of the outlet of the spout 5 so that the fertilizer dropping through the tube 21 will be deposited in that part of the furrow receiving the water.

A gate or valve 22 controls the flow of fertilizer from the receiver 17, said gate being attached to a shaft 23 journaled in the receiver and having one end passing beyond the same as said one end receives an arm 24 having a plurality of holes 25 therein, any one of which is adapted to receive a pin 26 passing through the rear end of a rod 27 which has its front end connected by a pin 28 to an upright 29 attached to an arm of the shaft 8. The upright has a plurality of holes 30 therein, any one of which is adapted to receive the pin 28. By adjusting the rod 27 on the arms 24 and 29 the operation of the valve and gate 22 can be adjusted so that the fertilizer will be deposited at the same time water is directed into the furrow from the spout 5.

As will be seen when an arm 11 engages the projection 10 the rod 9 will swing the arm 7 forwardly so as to open the valve 3 and the movement of the shaft 8 swings the arm or extension 29 rearwardly so as to cause the rod 27 to operate the gate or valve 22 to release some of the fertilizer from the receiver and thus this fertilizer will pass through the chute 21 to that part of the furrow receiving the water.

The gate is provided with a lip 22′ which acts as an agitator for the fertilizer in the receiver.

While the device is shown and described in use with an implement for depositing water at certain intervals in a furrow it is to be understood that the device can be used with a seed planter and in this case the parts are so arranged and adjusted as to cause a portion of the fertilizer to be deposited at substantially the same place in the furrow that the seeds are being deposited.

By removing the pins 26 and 28 to release the trip rod 27, the device will then act to broadcast the fertilizer in the furrow so that the invention can be used for placing the fertilizer in a furrow when planting beans, carrots and the like.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. A fertilizer attachment for a planter comprising a reservoir, a hose leading from the reservoir to the rear of the planter, a nozzle secured to the rear end of the hose, a valve controlling the flow of water from the hose, a rock shaft for operating the valve, means for rocking the shaft, an arm having openings and attached to the rock shaft, a fertilizer container mounted on the rear of the planter frame, a receiver communicating with the container, a flexible tube leading from the bottom of the receiver to a point immediately in the rear of the nozzle, a gate mounted within the receiver for controlling the flow of fertilizer, a second arm having openings and secured to the gate and journaled in the receiver, and means for selectively timing the opening and closing of both the valve and the gate relative to each other, said means comprising a rod having each end adjustably secured to one of the arms to connect said arms.

2. A fertilizer attachment for a planter comprising a reservoir, a hose leading from the reservoir to the rear of the planter, a nozzle secured to the rear end of the hose, a valve for controlling the flow of water from the hose, means for actuating the valve, said means comprising a rock shaft mounted on the frame of the planter, an arm having one end secured to the rock shaft, a rod connecting the valve with the other end of the arm, a second rod secured to the arm and to the first-mentioned rod at the junction of the first-mentioned rod and the arm, an adjustable projection mounted on the second rod, a rotatable shaft mounted on the frame and driven by the rotation of the rear axle of the planter, and roller arms secured to the rotatable shaft for engagement with the projection on the second rod, a fertilizer container mounted on the rear of the planter frame, a receiver communicating with the container, means controlled by the rotatable shaft for determining the amount of fertilizer passing into the receiver, a flexible tube leading from the bottom of the receiver to a point immediately in the rear of the nozzle, a gate mounted within the receiver, an arm secured to the gate and journaled in the receiver, a second arm attached to the rock shaft, both arms having openings therein, a third rod having each end adjustably connected to one of the arms to connect said arms, whereby when the roller arms engage the projection on the second rod, the opening and closing of the valve and gate are selectively timed by the adjusted position of the connecting rod on the connected arms.

ROBERT LEE GREENWELL.